(12) United States Patent
Gochenour (10) Patent No.: US 6,325,193 B1
(45) Date of Patent: Dec. 4, 2001

(54) FRICTION CLUTCH WITH AN ADJUSTMENT LIMITING DEVICE

(75) Inventor: Daniel V. Gochenour, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/552,276

(22) Filed: Apr. 19, 2000

(51) Int. Cl.$^7$ ..................................................... F16D 13/75
(52) U.S. Cl. ..................................... 192/70.25; 192/111 A
(58) Field of Search ............................... 192/70.25, 70.27, 192/89.24, 109 R, 111 A, 30 W (56) References Cited

U.S. PATENT DOCUMENTS

| | | |
|---|---|---|
| 5,069,322 | 12/1991 | Mizukami et al. . |
| 5,450,934 | 9/1995 | Maucher . |
| 5,632,365 | 5/1997 | Maucher . |
| 5,636,721 | 6/1997 | Weidinger . |
| 5,667,049 | 9/1997 | Weidinger et al. . |
| 5,690,203 | 11/1997 | Link et al. . |
| 5,695,036 * | 12/1997 | Gochenour et al. ............... 192/70.25 |
| 5,715,920 | 2/1998 | Lindner et al. . |
| 5,715,921 | 2/1998 | Link et al. . |
| 5,810,143 | 9/1998 | Weidinger . |
| 5,823,312 | 10/1998 | Reik et al. . |
| 5,826,691 | 10/1998 | Asada et al. . |
| 5,862,901 | 1/1999 | Weiss et al. . |
| 5,911,293 | 6/1999 | Weiss et al. . |
| 5,927,458 | 7/1999 | Weiss et al. . |
| 5,960,920 | 10/1999 | Brim et al. . |
| 5,971,124 | 10/1999 | Maucher . |
| 5,971,126 | 10/1999 | Hashimoto . |
| 5,988,338 | 11/1999 | Maucher . |
| 6,079,537 * | 6/2000 | Hofmann et al. .................. 192/70.25 |
| 6,116,396 * | 9/2000 | Mischler ........................... 192/70.25 |
| 6,123,180 * | 9/2000 | Weidinger ......................... 192/70.25 |

FOREIGN PATENT DOCUMENTS

| | | |
|---|---|---|
| 19507965 | 9/1995 | (DE) . |
| 19728613 | 2/1999 | (DE) . |
| 19729998 | 2/1999 | (DE) . |
| 19809388 | 9/1999 | (DE) . |
| 2599446 | 12/1987 | (FR) . |
| 2606477 | 5/1988 | (FR) . |
| 3-50136 | 7/1991 | (JP) . |
| 8-33165 | 3/1996 | (JP) . |
| 2656200 | 5/1997 | (JP) . |

OTHER PUBLICATIONS

Joachim Lindner and Reinhold Weidinger, "Xtend: a new concept for automatic wear compensation in clutches", SAE Technical Paper Series, SAE Brasil 99, Oct. 4 to 6, 1999.
pp. 46–57 of Mannesmann Sach AG Information/Promotional Brochure on Clutches (Substantially similar to the SAE Brasil 99 Article), date unknown.

* cited by examiner

*Primary Examiner*—Richard M. Lorence
(74) *Attorney, Agent, or Firm*—Loren H. Uthoff, Jr.; Kevin M. Hinman (57) ABSTRACT

A friction clutch for a motor vehicle with an automatic adjustment mechanism with a rotating cam includes an adjustment limiting mechanism. The second annular cam has a cam lock engagement surface extending radially inwardly of the cam surfaces. The cam lock engagement surface faces the pressure plate and concentric with an axis of rotation. A guide pin is fixed in the pressure plate and axially extends from the pressure plate on a side opposite the frictional engagement surface. A cam lock has a radially extending cam lock flange. The cam lock flange is axially disposed between the pressure plate and the cam lock engagement surface. The cam lock flange defines a flange engagement surface facing and complementary to the cam lock engagement surface. The cam lock has an aperture therein which slidably receives the guide pin. A bias spring engages the cam lock and biases the cam lock away from the pressure plate. When the clutch is in a released condition, the flange engagement surface is biased into engagement with the cam lock engagement surface by the bias spring with sufficient force to prevent rotation of the second cam relative to the first cam.

16 Claims, 6 Drawing Sheets

FRICTION CLUTCH WITH AN ADJUSTMENT LIMITING DEVICE

FIELD OF THE INVENTION

This invention relates to the field of friction clutches, and more particularly to friction clutches having automatic adjustment mechanisms.

BACKGROUND OF THE INVENTION

Known friction clutches provide a releasable torsional connection between a motor vehicle engine flywheel and an associated transmission. Repeated clutch disengagement and engagement cycles wear the friction material of the clutch driven disc. The wear results in a change in the axial location of the pressure plate in the engaged position. The shift in axial location results in a progressive decrease of the clutch engagement force or clamping load. Clutches are commonly provided with adjustment mechanisms to compensate for such wear.

The clutch clamping load is generated by a spring acting directly or indirectly against the pressure plate and reacting directly or indirectly against the clutch cover.

One type of spring configuration commonly employed is a diaphragm spring having an annular portion with radially inwardly directed fingers extending from the annular portion. The radially innermost tips of the fingers engage a release assembly. The fingers bow with a movement of the tips to deflect the annular portion, and thereby release the clutch, when the release assembly is axially displaced.

As the friction material wears, the engaged position of the finger tips, and the release assembly, move closer to the flywheel. Adjustment mechanisms disposed between the cover and the levers or between the pressure plate and the diaphragm spring compensate for this change.

One type of known adjustment mechanism relies on the relative rotation of two annular cams, each having inclined cam surfaces in engagement with each other. The relative rotation of the cams compensates for wear of the friction material. The cams are biased to rotate in a direction that increases a combined height or thickness of the cams. A rotative biasing force is induced by a torsional biasing spring functionally disposed between the two cams. A number of different spring configurations can be employed in this capacity, including coil tension springs, torsional round wire springs, and torsional flat wire springs.

It is also known to provide adjustment limiting devices which prevent the cams from overadjusting when the release bearing is moved too far. One such device relies on the use of pins frictionally engaged with the pressure plate to limit cam adjustment. However, such a mechanism relies on establishing a precise frictional relationship between the pins and the pressure plate to provide the desired adjustment limitation without interfering with the operation of the clutch. Further, the frictionally retained pins contribute to a reduction in the clamping load transferred to the friction material by the pressure plate.

It is desired to provide a mechanism for limiting the relative rotation of the cams which does not rely on overcoming a frictional relationship between the pressure plate and pins disposed therein.

SUMMARY OF THE INVENTION

A friction clutch for a motor vehicle includes a cover, a pressure plate, a diaphragm spring, an adjustment mechanism, and an adjustment limiting mechanism. The cover has an axis of rotation. The pressure plate is coupled to the cover for rotation therewith about the axis, and has a frictional engagement surface substantially normal to the axis. The diaphragm spring is interposed between the cover and the pressure plate and biases the pressure plate toward an engaged pressure plate position. The adjustment mechanism is centered about the axis. The adjustment mechanism includes a first annular cam, a second annular cam, and a cam spring. The first annular cam is rotatably fixed with respect to the pressure plate and the cover. The second annular cam is rotatable relative to the first annular cam. Both the first and second annular cams each have a plurality of mutually engaged cam surfaces configured such that rotation of the second cam relative to the first cam in a first direction increases a height of the adjustment mechanism. The second annular cam also defines a cam lock engagement surface which extends radially inwardly of the cam surfaces, faces the pressure plate and is concentric with the axis. The cam spring is connected to the second annular cam and is connected to the first annular cam so as to induce relative rotation therebetween. The adjustment limiting mechanism includes a guide pin, a cam lock and a bias spring. The guide pin is fixed in the pressure plate and axially extends from the pressure plate on a side opposite the frictional engagement surface. The cam lock has a radially extending cam lock flange. The cam lock flange is axially disposed between the pressure plate and the cam lock engagement surface. The cam lock flange defines a flange engagement surface facing and complementary to the cam lock engagement surface. The cam lock has an aperture therein slidably receiving the guide pin. The bias spring engages the cam lock and biases the cam lock away from the pressure plate. When the clutch is in a released condition, the flange engagement surface is biased into engagement with the cam lock engagement surface by the bias spring with sufficient force to prevent rotation of the second cam relative to the first cam.

There is also an improvement in a friction clutch for a motor vehicle having a cover, a pressure plate, a diaphragm spring, and an adjustment mechanism. The cover has an axis of rotation. The pressure plate is coupled to the cover for rotation therewith about the axis and has a frictional engagement surface substantially normal to the axis. The diaphragm spring is interposed between the cover and the pressure plate and biases the pressure plate toward an engaged pressure plate position. The adjustment mechanism is centered about the axis. The adjustment mechanism includes a first annular cam, a second annular cam, and a cam spring. The first annular cam is rotatably fixed with respect to the pressure plate and the cover. The second annular cam is rotatable relative to the first annular cam. The first and second annular cams each have a plurality of mutually engaged cam surfaces configured such that rotation of the second cam relative to the first cam in a first direction increases a height of the adjustment mechanism. The cam spring is connected to the second annular cam and is connected to the first annular cam so as to induce relative rotation therebetween. The improvement includes the second annular cam having a cam lock engagement surface extending radially inwardly of the cam surfaces, facing the pressure plate and concentric with the axis. The improvement also includes a guide pin, a cam lock, and a bias spring. The guide pin is fixed in the pressure plate and axially extends from the pressure plate on a side opposite the frictional engagement surface. The cam lock has a radially extending cam lock flange. The cam lock flange is axially disposed between the pressure plate and the cam lock engagement surface. The cam lock flange defines a flange engagement surface facing and complementary to the cam lock engagement surface. The cam lock has an aperture therein slidably receiving the guide pin. The bias spring engages the cam lock and biases the cam lock away from the pressure plate. When the clutch is in a released condition, the flange engagement surface is biased into engagement with the cam lock engagement surface by the bias spring with sufficient force to prevent rotation of the second cam relative to the first cam.

The disclosed clutch provides a mechanism for limiting the relative rotation of the cams which does not rely on overcoming a frictional relationship between the pressure plate and pins disposed therein.

DESCRIPTION OF THE PREFERRED EMBODIMENTS

Figures 1, 2:
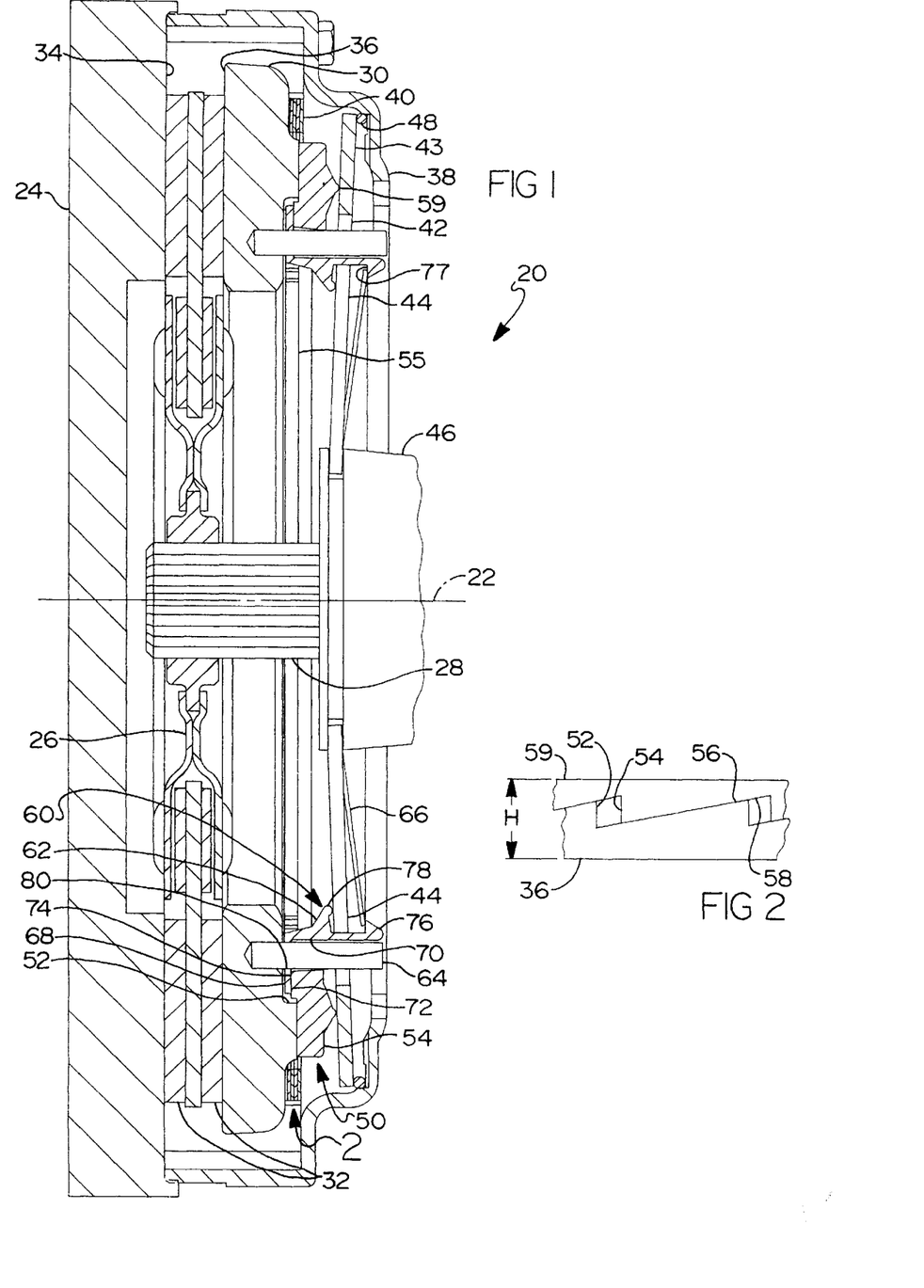
FIG. 1 is a sectional side view of a clutch assembly.
FIG. 2 is a broken out, schematic view of the cams in the direction of arrow 2 of FIG. 1.

A frictional clutch 20 for a motor vehicle is shown in FIG. 1. Clutch 20 rotates about an axis 22. A flywheel 24 is rotatably fixed to a crankshaft of a motor vehicle engine (not shown). A driven disc 26, centered with respect to axis 22, has a splined hub portion which slidably engages a splined input shaft 28. Driven disc 26 is sandwiched between flywheel 24 and a pressure plate 30. Driven disc 26 has friction elements 32 which are engaged by a flywheel engagement surface 34 and a pressure plate engagement surface 36 when clutch 20 is in an engaged condition.

A cover 38 is disposed over pressure plate 30 and is fixed to flywheel 24. A plurality of straps 40 circumferentially extend between pressure plate 30 and cover 38. Straps 40 rotatably fix pressure plate 30 to cover 38 while allowing relative axial displacement of pressure plate 30 to cover 38. Straps 40 are configured to serve as springs which bias pressure plate 30 away from flywheel 24.

A diaphragm spring 42 is axially disposed between cover 38 and pressure plate 30. An annular portion 43 of diaphragm spring 42 biases pressure plate 30 toward flywheel 24, clamping driven disc 26 between flywheel 24 and pressure plate 30 to rotatably connect or lock input shaft 28 with flywheel 24 when clutch 20 is in an engaged position. Diaphragm spring 42 has a plurality of radially inwardly extending spring fingers 44, the radially inner tips of which are engaged by an axially displaceable release assembly 46. A pivot ring 48 is axially disposed between an outer diameter of annular portion 43 and cover 38. Ring 48 facilitates the pivoting or flexing of annular portion 43 relative to cover 38.

Clutch 20 is selectively released or disengaged by axially displacing release assembly 46 along axis 22 in a direction away from flywheel 24 against the force of diaphragm spring 42. Such displacement is achieved by a vehicle operator through a pedal operated clutch linkage (not shown). As the radially inner tips of fingers 44 are axially displaced away from flywheel 24, fingers 44 bow, causing annular portion 43 to deflect, thereby relieving the clamping load against pressure plate 30, and permitting rotation of input shaft 28 relative to flywheel 24.

An adjustment mechanism 50 is disposed between pressure plate 30 and diaphragm spring 42 at a location radially inwardly of pivot ring 48. Adjustment mechanism 50 compensates for wear of friction elements 32.

The adjustment mechanism 50 comprises, in its most basic elements, first and second relatively rotatable annular cams 52 and 54 respectively and a cam spring 55. Cam spring 55 has a first end fixed relative to first cam 52 and a second end fixed relative to second cam 54, and thereby induces relative rotation between cams 52 and 54. In the embodiment of FIG. 1, first or stationary cam 52 is formed integral with pressure plate 30. Second or rotatable cam 54 is annular in shape and can be formed of any adequately rigid material, including steel and plastic. First cam 52 and second cam 54 have first cam surfaces 56 and second cam surfaces 58 respectively in engagement with each other. Both first cam 52 and second cam 54 are concentric with axis 22. An effective pressure plate thickness H from engagement surface 36 to a fulcrum 59 of second cam 54 is controlled by the relative rotative position of second cam 54 relative to first cam 52. Diaphragm spring 42 need not engage either of cams 52, 54 directly, as a second pivot ring could be used to define fulcrum 59.

The force of diaphragm spring 42 against fulcrum 59 in the clutch engaged condition shown in FIGS. 1 and 2 forces second cam 54 against first cam 52. The slope of cam surfaces 56 and 58 and the coefficient of friction between surfaces 56 and 58 is such that surfaces 56 and 58 will not slide relative to each other in the clutch engaged condition. The bias force of cam spring 55 is inadequate to overcome the force between cam surfaces 56 and 58 in the engaged condition. While cam surfaces 56 and 58 can be provided with mechanical features such as teeth or steps to further increase the resistance of surfaces 56 and 58 to slippage under axial load, they are preferably made smooth. When fulcrum 59 is sufficiently unloaded, cam spring 55 induces rotation of second cam 54 relative to first cam 52 in a direction increasing height H. It is readily apparent that if diaphragm spring 42 is excessively displaced at the point of contact with fulcrum 59 due to excessive release assembly 46 travel, excessive rotation of second cam 54 would result. Such excessive rotation would result in a height H being so large as to prevent complete disengagement of clutch 20, resulting in premature wear of friction elements 32. Adjustment limiting mechanism 60 prevents excessive rotation of second cam 54.

Figure 12:
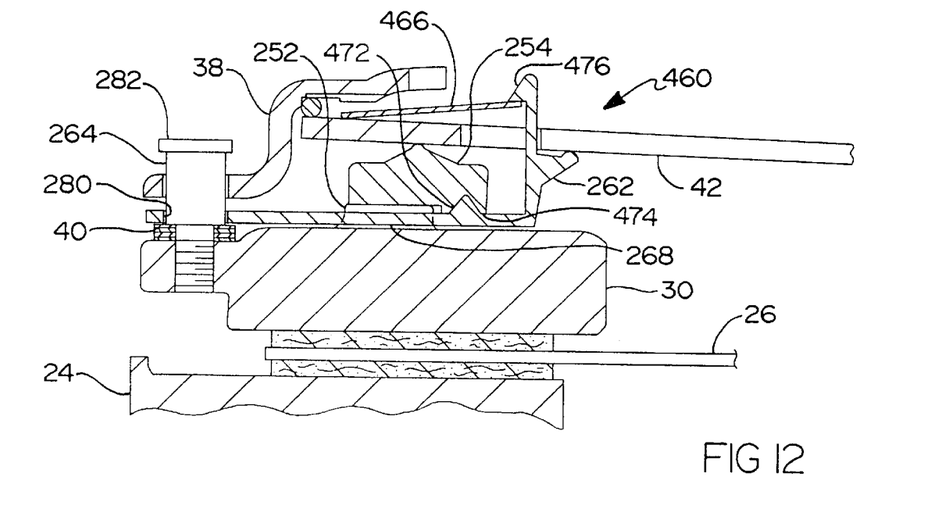
FIG. 12 is a sectional view of yet another alternative embodiment of the clutch assembly of FIG. 1.

A first embodiment of adjustment limiting mechanism 60 is shown in FIGS. 1–5 and 8 and 9. Mechanism 60 includes an annular cam lock 62, a plurality of guide pins 64 and an annular bias spring 66. Cam lock 62 is located radially inwardly of first cam 52. Cam lock 62 has a cam lock flange 68 extending radially outwardly from an inner ring portion 70. Cam lock flange 68 axially overlaps second cam 54, and has a flange engagement surface 72 facing a cam lock engagement surface 74 of second cam 54. Surfaces 72 and 74 are complementary to each other and concentric with axis 22. The complementary nature of the shapes of surfaces 72 and 74 ensures engagement between surfaces 72 and 74. While surfaces 72 and 74 are shown in most of the figures as being flat, they could alternatively be conical, or they could have a wedge shaped cross section as shown in FIG. 12. Inner ring portion 70 has three spring engagement tangs 76 extending axially therefrom. Tangs 76 have barbs which are presented radially inwardly for engagement of a lip 77 of the barb with an outer diameter of a Belleville-type bias spring 66. Spring 66 biases cam lock 62 away from pressure plate 30. An inner diameter of bias spring 66 engages fingers 44. A cam lock pivot 78 extends radially inwardly of inner ring portion 70 on a side of diaphragm spring 42 facing pressure plate 30. Cam lock pivot 78 engages spring fingers 44 to limit the movement induced by bias spring 66 of cam lock 62 relative to diaphragm spring 42. While three tangs 76 are employed, more tangs could be used if so desired. Tangs 76 are preferably evenly spaced from each other around ring 70. It is also possible to employ a single ring (not shown) in place of tangs 76. The second ring would be formed separately from inner ring 70 and joined to ring 70 by a plurality of axially extending tabs passing between fingers 44. Inner ring 70 and the second ring would sandwich diaphragm spring 42. Bias spring 66 is a low load spring compared to diaphragm spring 42. A typical clamp load induced by diaphragm spring 42 is 8000 pounds (35,600 Newtons). In contrast, the load induced by bias spring 66 is preferably approximately 200 pounds (890 Newtons).

Cam lock flange 68 has a plurality of apertures 80 which slidably receive guide pins 64. Pins 64 are oriented parallel to axis 22 and are fixed to pressure plate by any suitable means, including press fitting pins 64 in apertures placed in pressure plate 30. Pins 64 are located proximate to an inner diameter of second cam 54 and help maintain the concentric orientation of second cam 54 relative to axis 22. Cam lock 62 is free to move axially along pins 64 without any significant frictional drag between cam lock 62 and pins 64. Pins 64 also prevent cam lock 62 from rotating. Although apertures and tangs 76 are shown in equal number, and in alignment with each other, neither condition is required for cam lock 62 to operate as intended.

When substantially all of the force of bias spring 66 acting on tangs 76 is transferred to flange 68 and against cam lock engagement surface 74, second cam 54 is prevented from rotating relative to diaphragm spring 43 and pressure plate 30 by the frictional force between flange engagement surface 72 and cam lock engagement surface 74. Mechanical features such as teeth can be added to surfaces 72 and 74 to increase the resistance to rotation between second cam 54 and cam lock 62. Providing teeth on surfaces 72 and 74, like providing teeth on cams surfaces 56 and 58, causes second cam 54 to index relative to first cam 52 in finite steps instead of adjusting in infinitely small increments. The teeth on surfaces 72 and 74 also increase the amount of axial departure of the diaphragm spring 42 from the pressure plate 30 required to obtain relative rotation between second cam 54 relative to first cam 52. For several reasons, it is preferable to place engagement teeth on surfaces 72 and 74 instead of cam surfaces 56 and 58. Such reasons include: ease of manufacturing, as it is easier to form teeth which can be correctly aligned on surfaces 72, 74 than on cam surfaces 56, 58; reduced sensitivity to any misalignment of teeth between surfaces 72 and 74, as any misalignment of teeth on surfaces 72 and 74 would have no effect on the plane of fulcrum 59; and reduced risk of locking of such teeth, as the force of bias spring 66 separates surfaces 72 and 74, thereby overcoming any the unintentional locking of teeth on the mating surfaces 72 and 74 which would in turn prevent rotation of cam 54 relative to cam 52.

Figure 3:
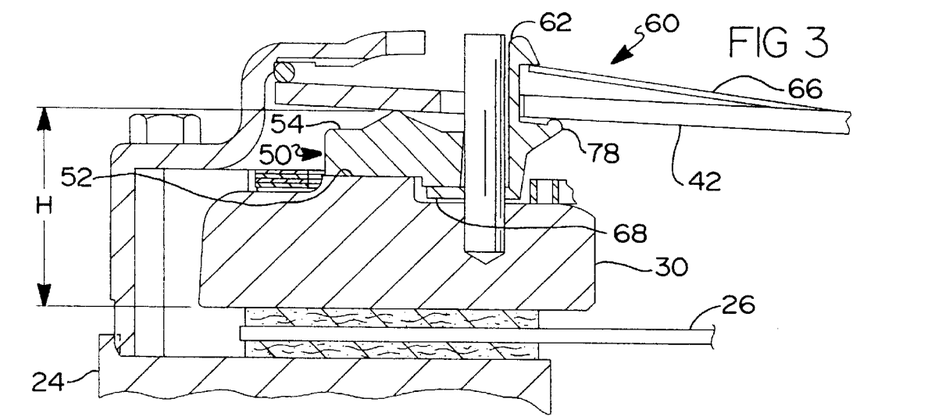
FIG. 3 is a broken out portion of the clutch assembly of FIG. 1 showing the clutch in an engaged and unworn condition.

Adjustment mechanism 50 and adjustment limiting mechanism 60 operate together in the following manner. In an adjusted, unworn condition as shown in FIGS. 1 and 3, pressure plate 30 is biased toward flywheel 24 and against driven disc 26 by diaphragm spring 42. Second cam 54 is in a first position relative to pressure plate 30 and first cam 52, providing a first height H. While in FIGS. 1 and 3, cam lock 62 is shown simultaneously engaging diaphragm spring 42 at cam lock pivot 78 in addition to engaging second cam 54 with flange 68, this potential reduction in the force of flange 68 against cam 54 is inconsequential, if diaphragm spring 42 no longer engages pivot 78 when driven disc 26 is unloaded or unclamped.

Figure 4:
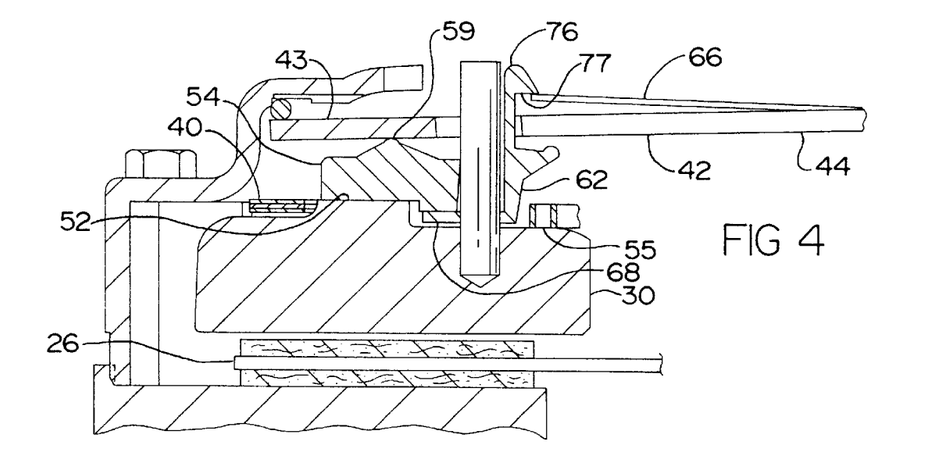
FIG. 4 is the portion of the clutch assembly of FIG. 3 showing the clutch in a disengaged and unworn condition.

When release assembly 46 is pulled away from flywheel 24, the tips of fingers 44 move as well, bending fingers 44 and annular portion 43 away from pressure plate 30 as shown in FIG. 4. Pressure plate 30, due to the bias force of straps 40, continues to follow diaphragm spring 42 after driven disc 26 has been unloaded to a predetermined limit of pressure plate travel. Cam lock 62 remains engaged with second cam 54, and fulcrum 59 remains in engagement with annular portion 43 because of the force of flange 68 against second cam 54. Cam 54 does not rotate because of the braking effect of flange 68 on second cam 54 induced by the force of bias spring 66. Even if release assembly 46 is displaced excessively far, and second cam 54 is lifted off of first cam 52, there is no relative rotation between cams 52 and 54 because the force of bias spring 66 holding flange engagement surface 72 against cam lock engagement surface 74 cannot be overcome by cam spring 55.

Figure 5:
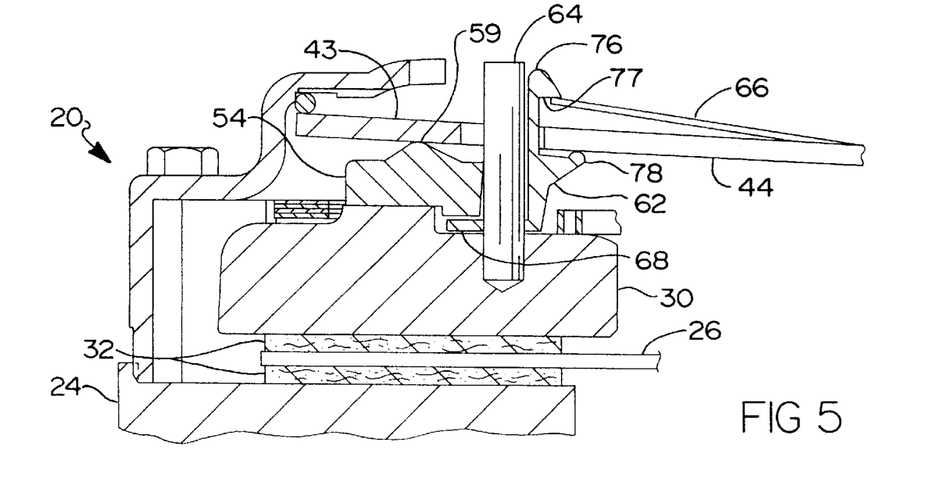
FIG. 5 is the portion of the clutch assembly of FIG. 3 showing the clutch in an engaged, unadjusted and worn condition.
Figure 6:
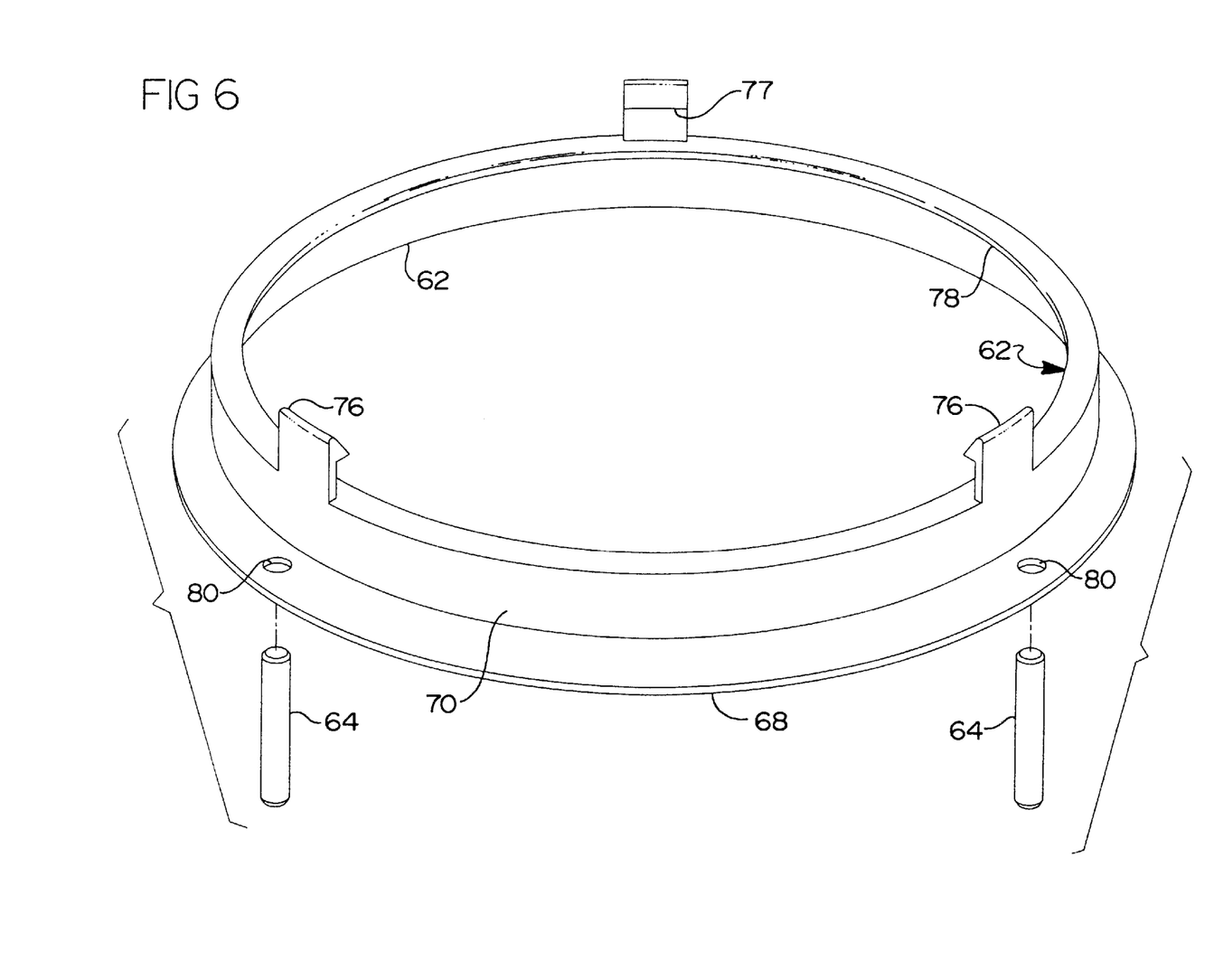
FIG. 6 is a perspective view of a cam lock aligned with guide pins.
Figure 7:
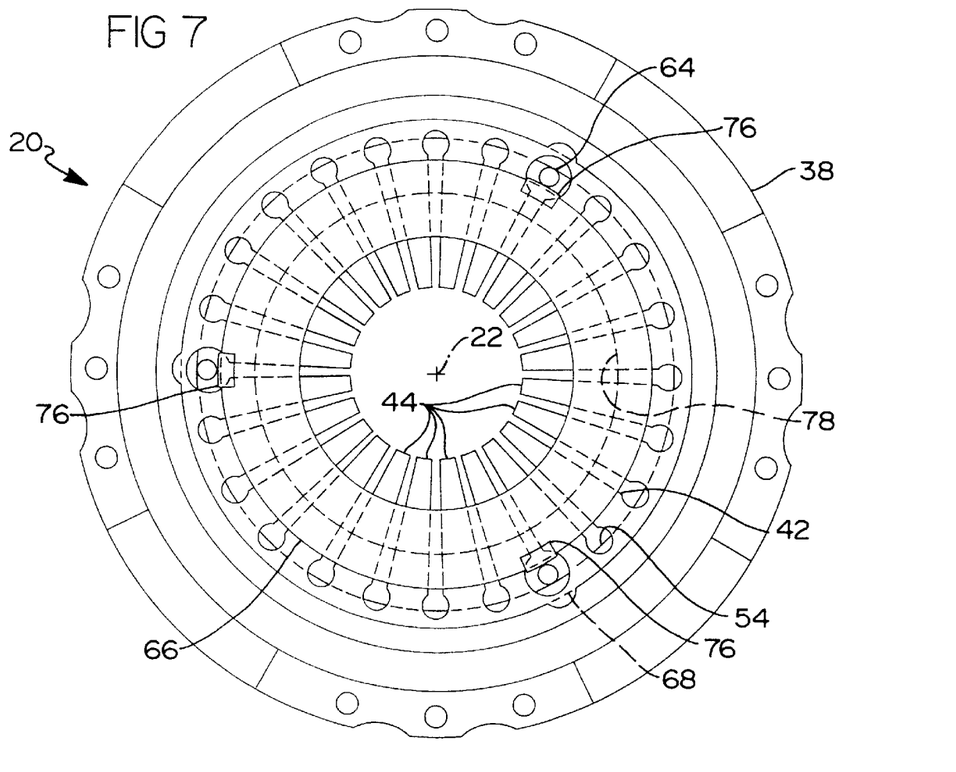
FIG. 7 is an end view of the clutch assembly of FIG. 1.

FIG. 5 shows clutch 20 in an engaged, worn and unadjusted condition. Wear of friction elements 32 without a compensating rotation of second cam 54 has resulted in the tips of fingers 44 and release assembly 46 being disposed closer to flywheel 24 than in the unworn condition as shown in FIGS. 1 and 2. The angle of fingers 44 relative to flywheel 24 in the worn and unadjusted condition is such that the contact between cam lock pivot 78 and fingers 44 moves cam lock 62 closer to flywheel 24.

Adjustment occurs when clutch 20 is released. As release assembly 46 is displaced away from flywheel 24, fingers 44 and annular portion 43 deflect a corresponding amount. For a brief period of time, the load of annular portion 43 against fulcrum 59 is sufficiently low to allow second cam 54 to rotate relative to pressure plate 30, increasing height H. However, the amount of rotation which occurs is limited by cam lock 62. After just a brief amount of rotation, flange 68 is brought into contact with second cam 54, with fulcrum 59 being forced against annular portion 43 and second cam 54 being resultantly brought to a halt by the engagement. If surfaces 72 and 74 have teeth, they must be separated by a distance greater than the height of the teeth before rotation can occur. When clutch 20 is re-engaged, the cam lock 62 resumes the orientation shown in FIG. 1, as long as there is no significant wear of th e friction material 32 on re-engagement.

It should be appreciated that cam lock 62 and bias spring 66 can take other forms.

Figure 8:
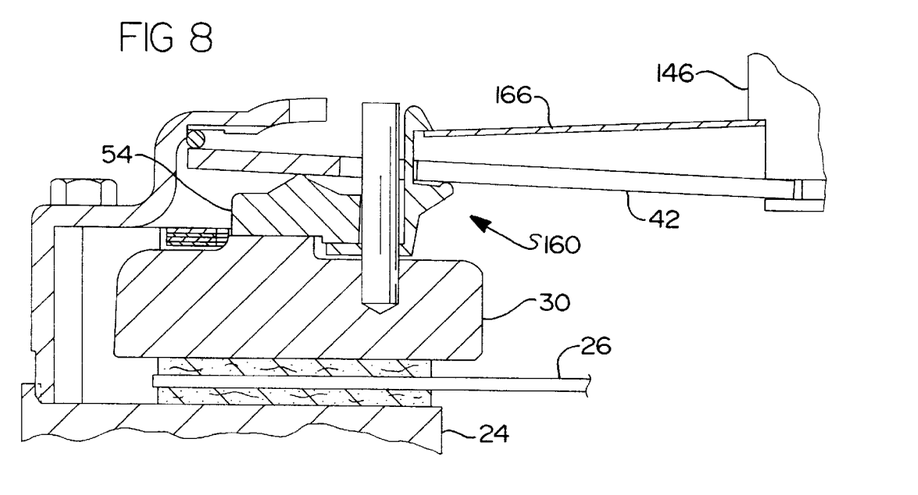
FIG. 8 is a sectional view of a first alternative embodiment of the clutch of FIG. 1

FIG. 8 shows a first alternative structure for an adjustment limiting mechanism 160 in which a bias spring 166 is oriented to act not against fingers 44, but against release assembly 146. In spite of the change, the adjustment limiting 160 mechanism operates in the same manner as adjustment limiting mechanism 60 of FIGS. 1–7.

Figure 9:
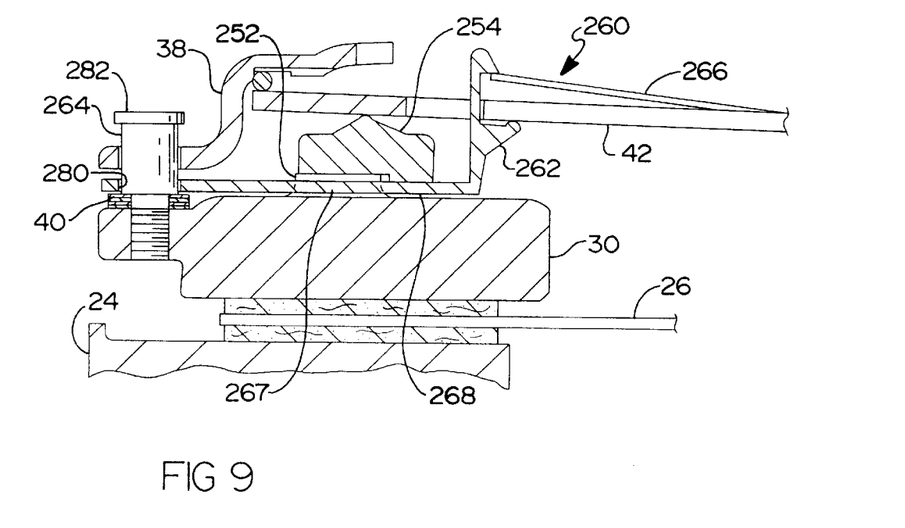
FIG. 9 is a sectional view of a second alternative embodiment of the clutch of FIG. 1.

FIG. 9 shows a second alternative structure for an adjustment limiting mechanism 260. Cam lock 262 has a plurality of a extensions 267 radially outwardly extending from cam lock flanges 268 to engage cover 38. Extensions 267 each have an aperture 280 receiving a guide pin 264. Guide pins 264 are provided by strap retention bolts 282 disposed radially outwardly of pressure plate engagement surface 36. It should be understood that, even though they are not shown in FIG. 9, pins like those shown in FIGS. 3–8 may still be employed to maintain second cam 254 concentric with respect to axis 22. Cam lock extensions 267 pass between first cam 252 and second cam 254 through a slot or a notch at the interface of cams 252 and 254 to extend to guide pins 264.

Figure 10:
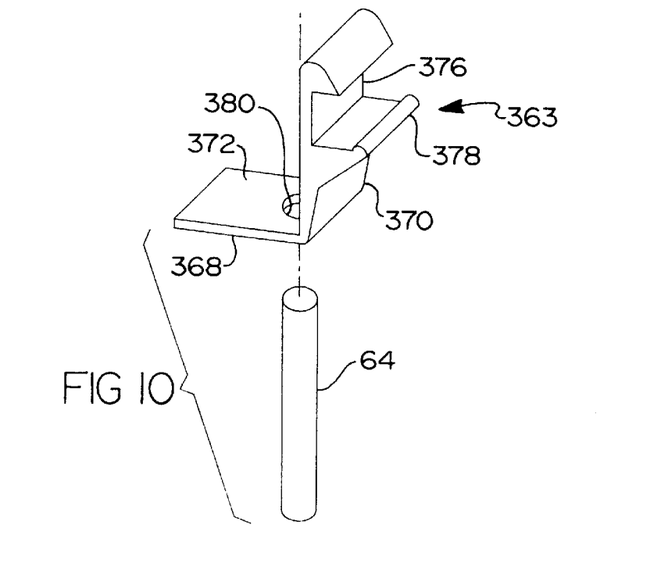
FIG. 10 is a perspective view of a cam lock element of one alternative form of the cam lock of FIG. 5, aligned with a guide pin.
Figure 11:
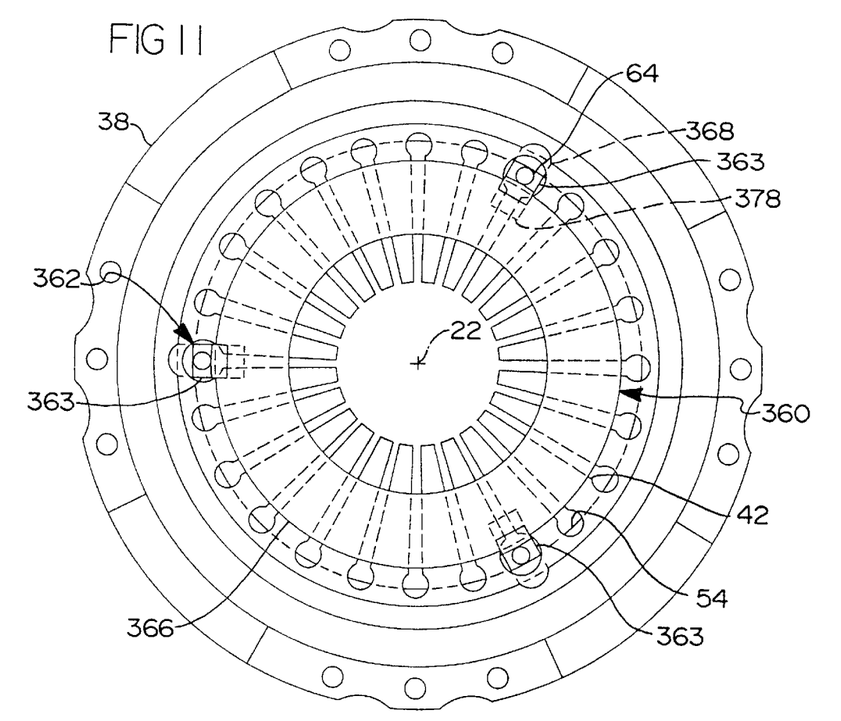
FIG. 11 is an end view of a clutch assembly employing a cam lock of the type shown in FIG. 10.

FIGS. 10 and 11 show a third alternative embodiment of an adjustment mechanism 360 in which a cam lock 362 comprises three cam lock elements 363. While three cam lock elements 363 are employed, a greater number could be employed if so desired. Each of cam lock elements 363 has a cam lock flange 368 extending from a base portion 370. When cam lock elements 363 are installed in a clutch as shown in FIGS. 10 and 11, flange 368 extends radially outwardly from base portion 370. Cam lock flange 368 axially overlaps second cam 54, and has a flange engagement surface 372 facing a cam lock engagement surface 74 of second cam 54. As with surfaces 72 and 74, surfaces 372 and 74 are complementary. Each cam lock element 363 has a single spring engagement tang 376 axially extending from base portion 370. Tangs 376 each have a barb engaging bias spring 366. A cam lock pivot 378 extends, in the installed condition, radially inwardly from base portion 370 on a side of diaphragm spring 42 facing pressure plate 30. An aperture 380 passes through flange 368 and receives guide pin 364. Cam lock elements 363 are prevented from rotating about pin 64 by their engagement with bias spring 366.

FIG. 12 shows a fourth alternative embodiment of an adjustment limiting mechanism 460. Adjustment limiting mechanism 460 is substantially like adjustment limiting mechanism 260 shown in FIG. 9, except that bias spring 466 is disposed radially outwardly of spring engagement tangs 476 instead of radially inwardly. The barbs consequently are presented radially outwardly instead of radially inwardly to engage an inner diameter edge of bias spring 466. An outer diameter edge of bias spring 466 engages annular portion 43 of diaphragm spring 42. The bias spring orientation shown in FIG. 12 could be employed with any of the embodiments discussed above. Cam lock surface 472 has a wedge shaped cross section, and is complementary to camlock engagement surface 474. This advantageously increases the amount of overlapping surface area between surfaces 472 and 474.

The shape of bias spring 66 can also be other than annular or conical. Leaf springs could be employed in place of Belleville-type springs. Compression coil springs can be used as well. In one preferred embodiment, a four cam elements 363 are employed, with one coil spring per each cam lock element. Coil springs are particularly well suited for development testing, as they can be mounted in such a way as to facilitate the adjustment of bias spring loads during development testing. The springs are selectively compressed to achieve the desired bias load against their associated cam lock element by adjusting a set screw. Shims provide an alternative means of selectively compressing the springs.

It should be appreciated that there are yet additional readily apparent alternative embodiments to the above described clutch configurations. For example, a different type of cam spring other than that shown in the figures may be employed, or a cushioned driven disc may be employed. If an annular type of bias spring is employed, it may have a plurality of radially extending slits.

It should be appreciated that the embodiments disclosed herein have been discussed for the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

I claim:

1. A friction clutch for a motor vehicle comprising:
a cover having an axis of rotation;
a pressure plate coupled to the cover for rotation therewith about the axis and having a frictional engagement surface substantially normal to the axis;
a diaphragm spring interposed between the cover and the pressure plate biasing the pressure plate toward an engaged pressure plate position;
an adjustment mechanism centered about the axis, the adjustment mechanism including:
a first annular cam rotatably fixed with respect to the pressure plate and the cover,
a second annular cam rotatable relative to the first annular cam and both the first and second annular cams each having a plurality of mutually engaged cam surfaces configured such that rotation of the second cam relative to the first cam in a first direction increases a height of the adjustment mechanism and the second annular cam also defining a cam lock engagement surface extending radially inwardly of the cam surfaces and facing the pressure plate and concentric with the axis, and
a cam spring connected to the second annular cam and connected to the first annular cam so as to induce relative rotation therebetween; and an adjustment limiting mechanism including:
a guide pin fixed in the pressure plate and axially extending from the pressure plate on a side opposite the frictional engagement surface;
a cam lock having a radially extending cam lock flange with the cam lock flange axially disposed between the pressure plate and the cam lock engagement surface and the cam lock flange defining a flange engagement surface facing and complementary to the cam lock engagement surface and the cam lock having an aperture therein slidably receiving the guide pin,
a bias spring engaging the cam lock and biasing the cam lock away from the pressure plate
wherein when the clutch is in a released condition, the flange engagement surface is biased into engagement with the cam lock engagement surface by the bias spring with sufficient force to prevent rotation of the second cam relative to the first cam.

2. A friction clutch for a motor vehicle as claimed in claim 1 wherein the cam lock includes a plurality of cam lock elements spaced around a circumference.

3. A friction clutch for a motor vehicle as claimed in claim 1 wherein the cam lock is annular.

4. A friction clutch for a motor vehicle as claimed in claim 1 wherein the bias spring is annular.

5. A friction clutch for a motor vehicle as claimed in claim 4 wherein the bias spring is a Belleville spring.

6. A friction clutch for a motor vehicle as claimed in claim 1 wherein the cam lock has a radially inwardly extending spring engagement lip engaged by the bias spring.

7. A friction clutch for a motor vehicle as claimed in claim 1 wherein the cam lock has a radially inwardly extending cam lock pivot disposed between the diaphragm spring and the pressure plate and engaging the diaphragm spring in a clutch disengaged condition.

8. A friction clutch for a motor vehicle as claimed in claim 6 wherein the cam lock has a cam lock pivot and a spring engagement lip, both the cam lock pivot and the spring engagement lip extending radially inwardly from a common surface defining a C-shaped cross section, and the spring engagement lip is engaged by the bias spring.

9. In a friction clutch for a motor vehicle having a cover having an axis of rotation, a pressure plate coupled to the cover for rotation therewith about the axis and having a frictional engagement surface substantially normal to the axis, a diaphragm spring interposed between the cover and the pressure plate biasing the pressure plate toward an engaged pressure plate position, an adjustment mechanism centered about the axis with the adjustment mechanism including a first annular cam rotatably fixed with respect to the pressure plate and the cover and a second annular cam rotatable relative to the first annular cam with the first and second annular cams each having a plurality of mutually engaged cam surfaces configured such that rotation of the second cam relative to the first cam in a first direction increases a height of the adjustment mechanism, and a cam spring connected to the second annular cam and connected to the first annular cam so as to induce relative rotation therebetween, the improvement comprising:

the second annular cam having a cam lock engagement surface extending radially inwardly of the cam surfaces and facing the pressure plate and concentric with the axis, a guide pin fixed in the pressure plate and axially extending from the pressure plate on a side opposite the frictional engagement surface;

a cam lock having a radially extending cam lock flange with the cam lock flange axially disposed between the pressure plate and the cam lock engagement surface and the cam lock flange defining a flange engagement surface facing and complementary to the cam lock engagement surface and the cam lock having an aperture therein slidably receiving the guide pin, a bias spring engaging the cam lock and biasing the cam lock away from the pressure plate wherein when the clutch is in a released condition, the flange engagement surface is biased into engagement with the cam lock engagement surface by the bias spring with sufficient force to prevent rotation of the second cam relative to the first cam.

10. In a friction clutch for a motor vehicle as claimed in claim 9 wherein the cam lock includes a plurality of cam lock elements spaced around a circumference.

11. In a friction clutch for a motor vehicle as claimed in claim 9, wherein the cam lock is annular.

12. In a friction clutch for a motor vehicle as claimed in claim 9 wherein the bias spring is annular.

13. A friction clutch for a motor vehicle as claimed in claim 12 wherein the bias spring is a Belleville spring.

14. A friction clutch for a motor vehicle as claimed in claim 9 wherein the cam lock has a radially inwardly extending spring engagement lip engaged by the bias spring.

15. In a friction clutch for a motor vehicle as claimed in claim 9 wherein the cam lock has a radially inwardly extending cam lock pivot disposed between the diaphragm spring and the pressure plate and engaging the diaphragm spring in a clutch disengaged condition.

16. In a friction clutch for a motor vehicle as claimed in claim 14 wherein the cam lock has a cam lock pivot and a spring engagement lip, both the cam lock pivot and the spring engagement lip extending radially inwardly from a common surface defining a C-shaped cross section, and the spring engagement lip is engaged by the bias spring.

* * * * *